(12) United States Patent
Ang et al.

(10) Patent No.: US 11,215,724 B2
(45) Date of Patent: Jan. 4, 2022

(54) SYSTEMS AND METHODS TO UTILIZE A SENSOR TO PROVIDE SPATIAL RESOLUTION IN DOWNHOLE LEAK DETECTION

(71) Applicant: Halliburton Energy Services, Inc., Houston, TX (US)

(72) Inventors: Yi Yang Ang, Singapore (SG); Nam Nguyen, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 34 days.

(21) Appl. No.: 16/462,140

(22) PCT Filed: Jun. 29, 2018

(86) PCT No.: PCT/US2018/040362
§ 371 (c)(1),
(2) Date: May 17, 2019

(87) PCT Pub. No.: WO2020/005281
PCT Pub. Date: Jan. 2, 2020

(65) Prior Publication Data
US 2020/0271803 A1    Aug. 27, 2020

(51) Int. Cl.
*G01V 1/30*     (2006.01)
*E21B 47/107*   (2012.01)
*G01V 1/40*     (2006.01)

(52) U.S. Cl.
CPC ............ *G01V 1/306* (2013.01); *E21B 47/107* (2020.05); *G01V 1/40* (2013.01)

(58) Field of Classification Search
CPC ......... G01V 1/306; G01V 1/40; E21B 47/107
(Continued)

(56) References Cited

U.S. PATENT DOCUMENTS 4,327,576 A * 5/1982 Dickey ................ G01M 3/243
                                                    73/40.5 A
4,930,111 A   5/1990 Sullivan et al.
(Continued)

FOREIGN PATENT DOCUMENTS

WO    2015108668 A1    7/2015
WO    2016115030 A1    7/2016
(Continued)

OTHER PUBLICATIONS

University of Leicester, "Using averages", 2009. (Year: 2009).*
(Continued)

*Primary Examiner* — Michael P Nghiem
(74) *Attorney, Agent, or Firm* — McGuire Woods LLP

(57) ABSTRACT

The disclosed embodiments include leak detection systems and methods of downhole leak detection. In one embodiment, the method includes obtaining physical signals detected by a physical sensor over a period of time while the physical sensor is traveling along a wellbore, wherein the physical signals are acoustic signals of a leak. The method also includes performing a sequence extraction operation on the physical signals of the physical sensor to obtain a plurality of virtual signals associated with an array of virtual sensors, wherein each virtual sensor of the array of virtual sensors is located at a respective virtual distance relative to the physical sensor. The method further includes determining a signal strength of the plurality of virtual signals. The method further includes determining a location of the leak based on the signal strength of the plurality of virtual signals.

20 Claims, 4 Drawing Sheets

(58) Field of Classification Search
USPC .......................................................... 702/6
See application file for complete search history.

(56) References Cited

U.S. PATENT DOCUMENTS

| | | | |
|---|---|---|---|
| 10,392,925 B2* | 8/2019 | Ang | E21B 47/005 |
| 2006/0133203 A1 | 6/2006 | James et al. | |
| 2011/0188346 A1* | 8/2011 | Hull | E21B 47/107 367/35 |
| 2014/0110124 A1 | 4/2014 | Goldner et al. | |
| 2016/0258281 A1* | 9/2016 | Mandal | G01V 1/40 |
| 2017/0184751 A1 | 6/2017 | Ang et al. | |
| 2017/0321540 A1 | 11/2017 | Lu et al. | |
| 2018/0283167 A1* | 10/2018 | Ang | G01M 3/40 |
| 2018/0371897 A1* | 12/2018 | Ang | E21B 47/113 |
| 2020/0292728 A1* | 9/2020 | Ang | E21B 47/10 |

FOREIGN PATENT DOCUMENTS

| | | | | |
|---|---|---|---|---|
| WO | 2018071032 A1 | 4/2018 | | |
| WO | WO-2018071032 A1 * | 4/2018 | ........... | E21B 47/005 |
| WO | WO-2019132975 A1 * | 7/2019 | ............. | E21B 47/10 |

OTHER PUBLICATIONS

Lin, Lanxin, Hing-Cheung So, and Yiu-Tong Chan. "Accurate and simple source localization using differential received signal strength." Digital Signal Processing 23.3 (2013): 736-743.

Julian, Jennifer Yvonne, et al. "Detecting Ultrasmall Leaks with Ultrasonic Leak Detection, Case Histories from the North Slope, Alaska." International Oil Conference and Exhibition in Mexico. Society of Petroleum Engineers, 2007.

Julian, J. Y., et al. "Identifying Small Leaks with Ultrasonic Leak Detection-Lessons Learned in Alaska." SPE Annual Technical Conference and Exhibition. Society of Petroleum Engineers, 2013.

Aditama, Prihandono, et al. "Evaluation of a Passive Ultrasonic Log Application for Casing Integrity Assessment: A Case Study in a South Oman Field." SPE Asia Pacific Oil and Gas Conference and Exhibition. Society of Petroleum Engineers, 2012.

International Search Report and Written Opinion dated Mar. 29, 2019; International PCT Application No. PCT/US2018/040362.

* cited by examiner

SYSTEMS AND METHODS TO UTILIZE A SENSOR TO PROVIDE SPATIAL RESOLUTION IN DOWNHOLE LEAK DETECTION

BACKGROUND

The present disclosure relates generally to systems and methods to utilize a sensor to provide spatial resolution in downhole leak detection.

A wellbore is often drilled proximate to a subterranean deposit of hydrocarbon resources to facilitate exploration and production of hydrocarbon resources. Casing sections are often coupled together to extend an overall length of a casing (e.g., a production casing, an intermediate casing, or a surface casing) that is deployed in the wellbore to insulate downhole tools and strings deployed in the casing as well as hydrocarbon resources flowing through the casing from the surrounding formation to prevent cave-ins, and/or to prevent contamination of the surrounding formation. A cement job is usually performed to fixedly secure the casing to the wellbore and to form a barrier that isolates different zones of the wellbore. Over time, the casing and/or the cement sheath may weaken, and one or more leaks may form at different sections of the casing and/or cement sheath. Reservoir fluids that were previously isolated from the casing or isolated from one or more sections of the casing by the cement sheath may leak through the cement sheath and may affect the integrity of the well and jeopardize hydrocarbon production.

Sensors are sometimes deployed downhole to monitor leaks. For example, sensors are sometimes mixed with cement and are fixedly deployed along with the cement. Although stationary sensors may be utilized to detect leaks, sometimes the stationary sensors are not deployed proximate to the leaks, and thereby do not provide accurate information regarding the locations of the leaks. An array of multiple sensors (sensor array) is sometimes deployed along a production tubing, which extends down the wellbore. One or more sensors of the sensor array may be positioned proximate to the leak and thereby may be operable to detect the leak. Measurements made by different sensors of the sensor array may also be compared to obtain more accurate information regarding the leak. However, the cost associated with fitting the production tubing with multiple sensors, deploying the multiple sensors, and operating the multiple sensors increases proportionally with the number of sensors deployed in the sensor array. Further, in certain wellbore environments, it may be difficult and/or impractical to deploy multiple sensors, thereby impacting leak detection accuracy of the sensor array. Further, one or more sensors of the sensor array may malfunction, which would also adversely impact the accuracy of leak information obtained by the sensor array.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

Figure 1A:
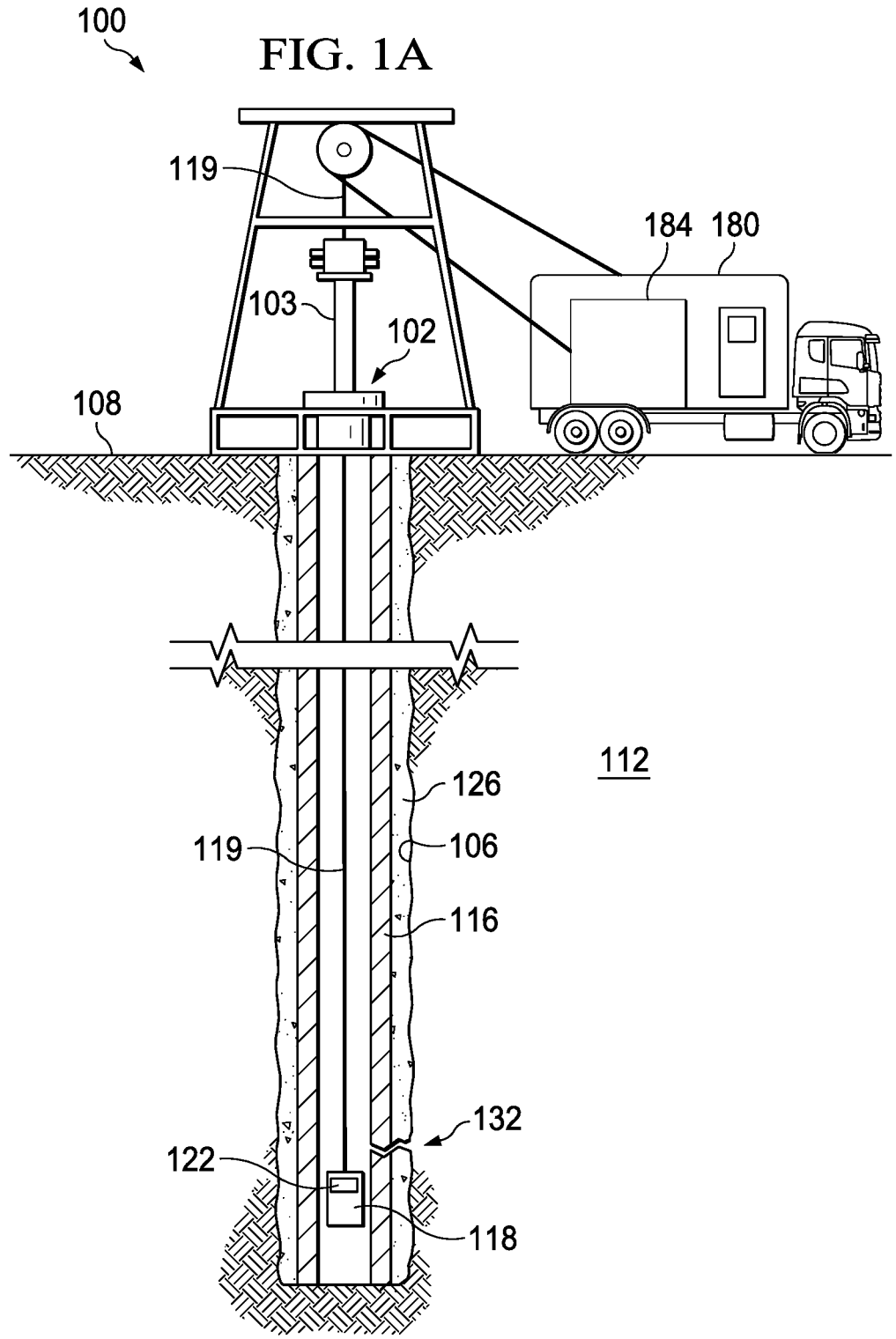
FIG. 1A is a schematic, side view of a wireline logging environment in which a leak detector having a physical sensor operable to detect leaks along a wellbore is deployed on a wireline in the wellbore.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to utilize at least one physical sensor to provide spatial resolution in leak detection, as well as downhole leak detectors having at least one physical sensor and operable to provide spatial resolution in leak detection. As defined herein, a physical sensor is an actual sensor that is deployed in a wellbore of a downhole environment and is operable to detect downhole leaks along the wellbore. More particularly, the physical sensor is deployed along a retractable string, such as a wireline tool string, a slickline tool string, a drill string, or another type of tool string operable to deploy the physical sensor. The retractable tool string may be deployed in a wellbore and retracted from the wellbore to facilitate the leak detector to travel between a surface location and a desired depth of the wellbore. In some embodiments, the physical sensor is a hydrophone that is operable to obtain acoustic signals indicative of the leak and originating from a source of the leak. In other embodiments, the physical sensor is an optical fiber that is operable to perform distributed acoustic sensing (DAS) or distributed strain sensing of disturbances caused by the leak. In other embodiments, the physical sensor is an electromagnetic detector operable to obtain electromagnetic signals indicative of the leak and originating from the source of the leak. In further embodiments, the physical sensor is a chemical detector operable to detect chemical imbalances caused by the leak.

As the leak detector travels up and/or down the wellbore, the physical sensor is operable to obtain physical signals indicative of the leak as detected by the physical sensor. As defined herein, "up the wellbore" and "down the wellbore" mean traveling along the wellbore towards a surface end of the wellbore, and traveling along the wellbore away from the surface end of the wellbore, respectively. As the physical sensor travels up and/or down the wellbore, the physical sensor continuously records physical signals of a leak at a high sampling rate over a period of time T. Each of the samples corresponds to a particular time and space instance within the wellbore. In some embodiments, the leak detector decomposes a recording of the physical signals of the leak during the time period T into multiple multi-channel frames, each having a threshold duration (e.g., $\Delta t$). In some embodiments, where an entire recording of T seconds is decomposed into N multi-channel frames, $\Delta t$ is determined by uniformly or by adaptively extracting a threshold duration from the entire T seconds long recording that has a high correlation with a certain sequence of interest, $\hat{T}_0$. For example, where a recording is ten seconds long, and a sequence of interest occurs in one second intervals three times during the ten seconds long duration, the recording is decomposed into three multi-channel frames, with each frame having a threshold duration of at least one second. In one or more of such embodiments, physical signals of the leak occur within the multi-channel frames.

With a received signal strength one sensor array (ROSA) approach to detect a leak location, the leak detector performs a sequence extraction operation on physical signals of the physical sensor to obtain a plurality of virtual signals associated with a virtual array of virtual sensors, where each virtual sensor of the array of virtual sensors is located at a virtual distance relative to the physical sensor. As defined herein, a virtual sensor is deployed at a virtual location and a virtual distance from the physical sensor, where the virtual location and the virtual distance have values that are identical to values of a physical location and a physical distance from the physical sensor, respectively. Further, the virtual sensor is a sensor that mimics a physical sensor such that virtual signals associated with the virtual sensor are approximately equal to physical signals that a physical sensor would detect if the physical sensor is located at a physical location that corresponds to the virtual location of the virtual sensor. For example, the leak detector is operable to perform the sequence extraction operation to obtain virtual signals for eight virtual sensors, located at the location of the physical sensor and at least $D_1$-$D_8$ from the location of the physical sensor, where $D_n$ is a numerical value of a physical distance from the physical sensor. The virtual signals of each virtual sensor of eight virtual sensors are approximately equal to physical signals obtained by the physical sensor if the physical sensor is located at the location of the respective virtual sensor.

The leak detector then determines a signal strength of the virtual signals and determines a location of the leak based on the strength of the virtual signals. In some embodiments, the leak detector determines the signal strength of each respective virtual signal and determines an average signal strength of the virtual signals, where the signal strength of the virtual signals is the average signal strength of the virtual signals. In some embodiments, the leak detector determines at least one parametric component of the signal strength of the virtual signals based on a transfer function between a source of the leak and the virtual signals and determines the signal strength of the virtual signals based on the at least one parametric component.

In some embodiments, the recording of the signals of the leak also contains noise signals. As referred to here, noise signals may be any acoustic signals that are not associated with the leak. In one or more embodiments, the leak detector determines noise components of the signals detected by the physical sensor and excludes the noise components of the signals when determining the signal strength of the virtual signals. For example, noise, such as the acoustic signals due to the movement of the moving sensor that is typically within the range of <2 kHz may be low/band pass filtered away to remove signals that are not representative of a leak signal. In some embodiments, the leak detector determines an average location of the virtual sensors based on the trajectory and velocity of the actual location of the physical sensor. In one or more of such embodiments, the leak detector determines the leak based on the received signal strength at the virtual sensors and matches the received signal strength with a derived transfer function such as EQ. 7 provided in the paragraphs below. Additional descriptions of the foregoing processes, exemplary formulas, and examples are provided in the paragraphs below and are illustrated by at least FIGS. 1-5. Further, although the foregoing operations are described to be performed by the leak detector, the operations may also be performed by a processor of another electronic device, such as a surface-based controller that is communicatively connected to the physical sensor and operable to receive the physical signals detected by the physical sensor.

Turning now to the figures, FIG. 1A is a schematic, side view of a wireline logging environment 100 in which a leak detector 118 having a physical sensor 122 operable to detect leaks along wellbore 106 is deployed on wireline 119 in the wellbore 106. In the embodiment of FIG. 1A, a well 102 having the wellbore 106 extends from a surface 108 of the well 102 to or through a subterranean formation 112. A casing 116 is deployed along the wellbore 106 to insulate downhole tools and strings deployed in the casing 116, to provide a path for hydrocarbon resources flowing from the subterranean formation 112, to prevent cave-ins, and/or to prevent contamination of the subterranean formation 112. The casing 116 is normally surrounded by a cement sheath 126, which is deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A vehicle 180 carrying the wireline 119 is positioned proximate the well 102. The wireline 119, along with the leak detector 118 and the physical sensor 122, are lowered through the blowout preventer 103 into the well 102. Data indicative of measurements obtained by the physical sensor 122 and/or processed by the leak detector 118 may be transmitted via the wireline 119 or via another telemetry system to the surface 108 for processing by controller 184 or by another electronic device operable to process data obtained by the physical sensor 122 and the leak detector 118. In the embodiment of FIG. 1A, the controller 184 is stored on the vehicle 180. In some embodiments, the controller 184 may also be housed in a temporary and/or permanent facility (not shown) proximate the well 102. In other embodiments, the controller 184 may also be deployed at a remote location relative to the well 102. Additional operations of the controller 184, are provided in the paragraphs below.

Figure 1B:
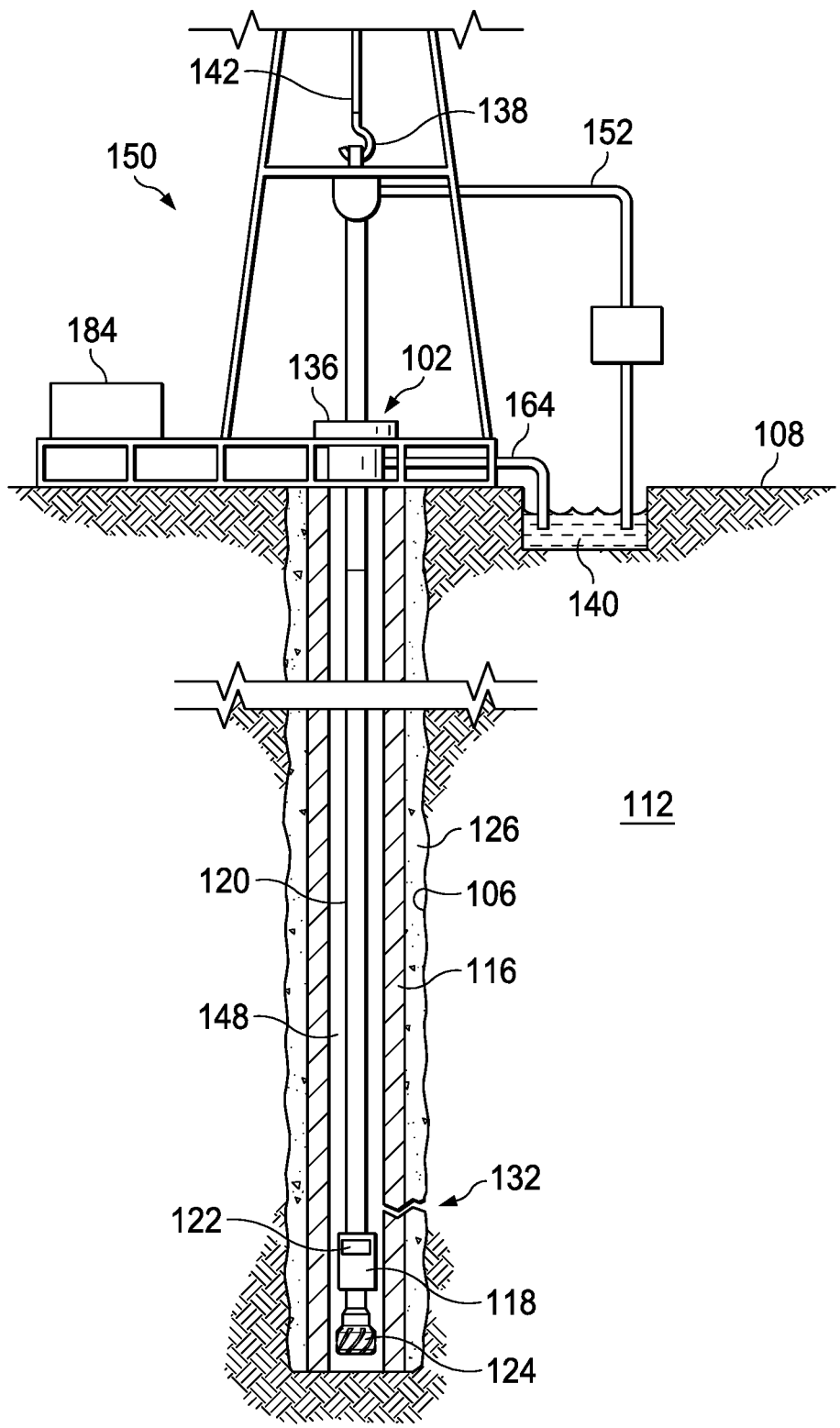
FIG. 1B is a schematic, side view of a measurement—while drilling (MWD)/logging-while-drilling (LWD) environment in which the leak detector of FIG. 1A is deployed in the wellbore to detect leaks long the wellbore.

FIG. 1B is a schematic, side view of a MWD/LWD environment 150 in which the leak detector 118 of FIG. 1A is deployed in the wellbore 106 to detect leaks along the wellbore 106. In the embodiment of FIG. 1B, a hook 138, cable 142, traveling block (not shown), and hoist (not shown) are provided to lower a tool string 120 down the wellbore 106 or to lift the tool string 120 up from the wellbore 106. The tool string 120 may be a drill string or another type of tool string operable to deploy the leak detector 118. At wellhead 136, an inlet conduit 152 is coupled to a fluid source (not shown) to provide fluids, such as drilling fluids, downhole. The tool string 120 has an internal annulus that provides a fluid flow path from the surface 108 down to the leak detector 118. The tool string 120 is coupled to the leak detector 118, which in the embodiment of FIG. 1B, includes the physical sensor 122. The fluids travel down the tool string 120 and exit the tool string 120 at drill bit 124. The fluids flow back toward the surface 108 through a wellbore annulus 148 and exit the wellbore annulus 148 via an outlet conduit 164 where the fluids are captured in a container 140.

The physical sensor 122 is operable to detect the presence of leaks, such as first leak 132. In the examples of FIGS. 1A and 1B, the first leak 132 represents a leak in the cement sheath 126. As the physical sensor 122 travels up and/or down the wellbore 106, the physical sensor 122 continuously records acoustic signals obtained by the physical sensor 122 over a period of time t. The leak detector 118 decomposes a recording of the acoustic signals obtained during the time period T into multiple multi-channel frames, each having a threshold duration (e.g., Δt). In some embodiments, physical signals of the leak occur within the multi-channel frames.

With a received signal strength one sensor array (ROSA) approach to detecting a leak location, a sequence extraction operation is performed on physical signals of leak to obtain a plurality of virtual signals associated with an array of virtual sensors, where each virtual sensor of the array of virtual sensors is located at a virtual distance relative to the physical sensor. The leak detector 118 then determines the signal strength of the virtual signals and determines a location of the leak based on the strength of the virtual signals.

In some embodiments, the leak detector 118 is further operable to determine an approximate radial distance of the first leak 132 relative to the physical sensor 122. In one of such embodiments, the radial distance includes a first component having a value along a first x-axis, and includes a second component having a value along a second y-axis, where the x-axis and y-axis are perpendicular axes that form a plane that is approximately perpendicular to a longitudinal axis (z-axis) of the wellbore 106. For example, if the physical sensor 122 is positioned at (x, y)=(0 m, 0 m), then the radial distance of the first leak 132 may indicate that the first leak 132 is (2 m, 3 m) relative to the physical sensor 122. In another one of such embodiments, the radial distance includes a first component having a value along a first x-axis, a second component having a value along a second y-axis, and a third component having a value along a z-axis, where the x-axis and y-axis are perpendicular axes that form a plane that is approximately perpendicular to a longitudinal axis (z-axis) of the wellbore 106. For example, if the physical sensor 122 is positioned at (x, y, z)=(0 m, 0 m, 0 m), then the radial distance of the first leak 132 may indicate that the first leak 132 is (2 m, 3 m, 5 m) relative to the physical sensor 122. In further embodiments, the leak detector 118 is further operable to determine one or more angles of the first leak 132 relative to the physical sensor 122. In one of such embodiments, an angle of the first leak 132 is indicative of an azimuth of the first leak 132 relative to the physical sensor 122. In another one of such embodiments, an angle of the first leak 132 is indicative of the altitude of the first leak 132 relative to the physical sensor 122.

Although the leak detector 118 has been described thus far as operable to perform the operations described in the foregoing paragraphs, in one or more embodiments the foregoing operations may also be wholly or partially performed by other surfaced based or downhole electronic devices communicatively connected to the leak detector 118 and operable to receive the physical signals detected by the physical sensor 122. For example, the controller 184, which is formed by one or more electronic devices, is operable to receive the detected physical signals and to perform the foregoing operations to compute a spatial spectrum indicative of the location of the first leak 132. Additional descriptions of the algorithms used to perform the foregoing operations are provided in the paragraphs below and are illustrated in at least FIGS. 2-5. Further, although FIGS. 1A and 1B illustrate the leak detector 118 and the physical sensor 122 deployed in two exemplary environments, the leak detector 118 and the physical sensor 122 may be deployed in various drilling, completion, and production environments. Further, although FIGS. 1A and 1B illustrate the leak detector 118 having one physical sensor 122, in some embodiments, the leak detector 118 is operable to utilize measurements obtained by multiple sensors (not shown) to perform operations described herein to obtain a plurality of virtual sensors, synchronize virtual signals of the plurality of virtual sensors, and to compute a spatial spectrum indicative of a location of the first leak 132 or another leak in the wellbore 106 based on the synchronized virtual signals.

Figure 2:
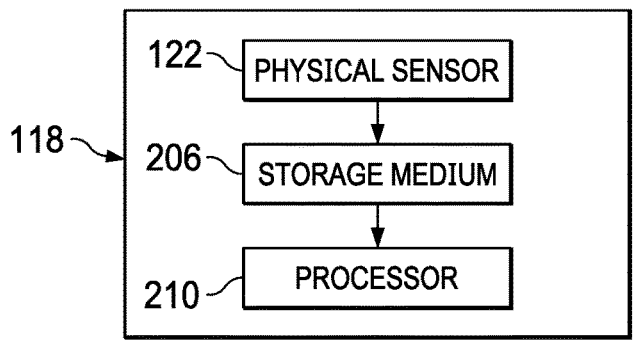
FIG. 2 illustrates a block diagram of components of the downhole leak detector of FIGS. 1A and 1B.

FIG. 2 illustrates a block diagram of components of the first downhole leak detector 118 of FIGS. 1A and 1B. The downhole leak detector 118 includes the physical sensor 122. In some embodiments, the physical sensor 122 is a hydrophone that is operable to obtain acoustic signals (physical signals) indicative of the leak and originating from a source of the leak. In other embodiments, the physical sensor 122 is an optical fiber that is operable to perform DAS or distributed strain sensing of disturbances caused by the leak to detect the physical signals. In further embodiments, the physical sensor 122 is an electromagnetic sensor operable to transmit electromagnetic signals that traverse the subterranean formation 112, and to detect variations to transmitted electromagnetic signals as well as secondary electromagnetic signals induced by the first leak 132 and/or by the subterranean formation 112. In further embodiments, the physical sensor 122 is operable to detect nuclear magnet resonance signals of particles of the subterranean formation 112 and/or fluids flowing through the first leak 132. In further embodiments, the physical sensor 122 is operable to detect one or more of a vibration, displacement, velocity, torque, acceleration, conductivity, acoustic impedance, and other properties of the wellbore 106 at a location proximate to first leak 132.

The leak detector 118 also includes a storage medium 206. The storage medium 206 is a machine-readable medium and may be formed from data storage components such as, but not limited to, read-only memory (ROM), random access memory (RAM), flash memory, magnetic hard drives, solid state hard drives, as well as other types of data storage components and devices. In some embodiments, the storage medium 206 includes multiple data storage devices. Physical signals detected by the physical sensor 122, as well as virtual signals associated with virtual sensors, are stored on the storage medium 206. The storage medium 206 also includes instructions for operating the leak detector 118 as well as instructions for establishing communications with other downhole and surface-based electronic devices such as the controller 184.

The leak detector 118 also includes a processor 210 that is operable to execute the instructions stored in the storage medium 206 to perform a sequence extraction operation on the physical signals of the physical sensor 122 to obtain virtual signals associated with an array of virtual sensors, where each virtual sensor of the array of virtual sensors is located at a respective virtual distance relative to the physical sensor 122. The processor 210 is also operable to execute the instructions stored in the storage medium 206 to determine a signal strength of the virtual signals. The processor 210 is further operable to execute the instructions stored in the storage medium 206 to determine a location of the first leak 132 based on the signal strength of the virtual signals. In one of such embodiments, the processor 210 is housed within a casing of the leak detector 118.

Although FIG. 2 illustrates the processor 210 as a component of the leak detector 118, in other embodiments, a processor of a surface-based electronic device (surface-based processor), such as the controller 184 is also operable to perform the operations of the processor 210. In one of such embodiments, physical signals obtained by the physical sensor 122 are transmitted to the controller 184 via one or more downhole telemetry systems. The surface-based processor is operable to perform the operations described herein to perform a sequence extraction operation on the physical signals of the physical sensor to obtain virtual signals associated with an array of virtual sensors, where each virtual sensor of the array of virtual sensors is located at a respective virtual distance relative to the physical sensor, determine a signal strength of the virtual signals and determine a location of the leak based on the signal strength of the virtual signals. In further embodiments, the processor 210 is a sub-component of the physical sensor 122. In further embodiments, the processor 210 is a separate component that is deployed at a downhole location and is operable to perform the operations described herein to compute the spectral spectrum indicative of the location of the first leak 132. In each of the foregoing embodiments, the processor 210 and the leak detector 118 form a leak detection system that performs the operations described herein to compute a spatial spectrum indicative of a location of a leak based on the synchronized virtual signals.

Figure 3:
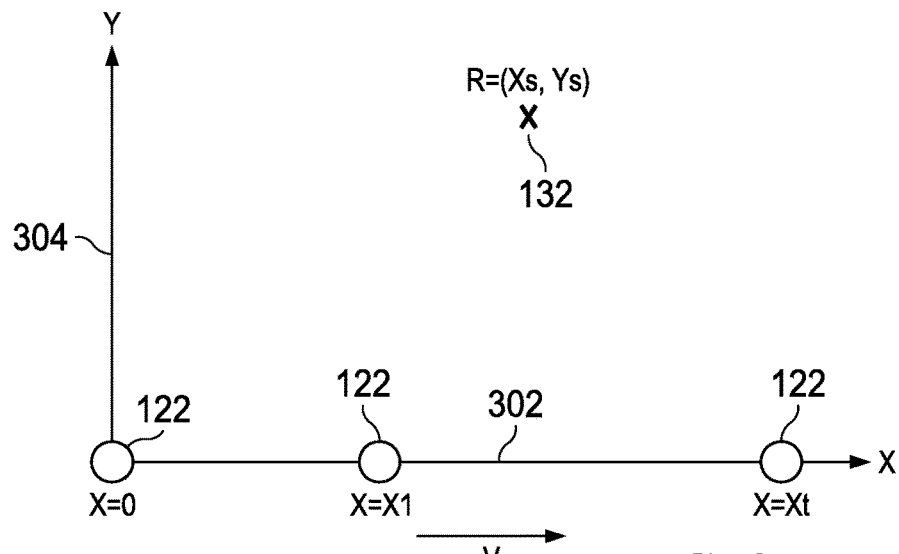
FIG. 3 illustrates a schematic view of the physical sensor of FIGS. 1A and 1B from a starting time to time=$t_n$ as the physical sensor travels along a longitudinal axis (x-axis) of the wellbore.

FIG. 3 illustrates a schematic view of the physical sensor 122 of FIGS. 1A and 1B from a starting time to time=$t_n$ as the physical sensor 122 travels along a longitudinal axis 302 (x-axis) of the wellbore 106. In the illustrated embodiment, the physical sensor 122 travels at a velocity v that is a known velocity while the physical sensor 122 samples physical signals. At time t=0, the location of the physical sensor 122 along x-axis 302 and a y-axis 304 is (0,0). At time t=$t_1$, the location of the physical sensor 122 along x-axis 302 and a y-axis 304 is ($X_1$,0). At time t=$t_n$, the location of the physical sensor 122 along x-axis 302 and a y-axis 304 is ($X_n$,0). As the physical sensor 122 travels along the x-axis 302, samples of physical signals detected by the physical sensor 122 are obtained and stored by the leak detector 118. The first leak 132 may generate a portion of the physical signals detected by the physical sensor 122. This portion of the physical signals is used to identify a location of the first leak 132 within the wellbore 106.

Figure 4:
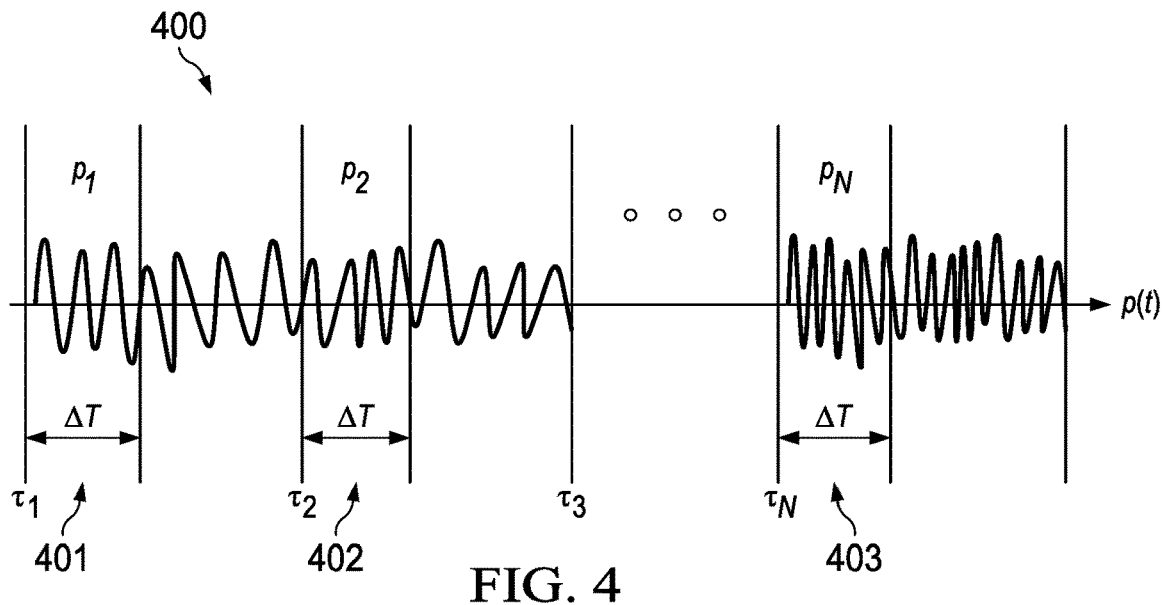
FIG. 4 illustrates a visual representation of the signal strength of a physical signal over time.

As the physical sensor 122 moves within the wellbore 106, the physical sensor 122 continuously records the physical signals at a high sampling rate. Each sample of the recording corresponds to a sample of the physical signals at a particular time and space instance. FIG. 4 illustrates a visual representation 400 of the signal strength of a recording p(t) obtained by the physical sensor over time. The leak detector 118 decomposes the recording of the acoustic signals obtained during the time period T into multiple multi-channel frames (e.g., frames 401, 402, 403, etc.), each having a threshold duration $\Delta T$. In some embodiments, physical signals of the leak occur within the multi-channel frames. In the illustrated embodiment, the physical sensor 122 moves at a known velocity equal to v and records acoustic signals for a period of time (recording window) equals to T seconds. In one or more embodiments, the recording $$p(t) = \frac{1}{r_t} s(t - r_t/c),$$

where s(t) is the signal response at a source of the leak located at $r_s$=(x, y) in free field, $r_t$=$\|vt-r_s\|_2$ is the radial distance of the source of the leak to the moving sensor at time t, p(t) may be decomposed as:

$$p(t)=[p_1(t)p_2(t) \ldots p_N(t)]^T, 0 \le t \le \Delta T, \qquad \text{EQ. 1}$$

where $p_n$=p(t+$\tau_n$) and $(\square)^T$ is the transpose operation. Expanding the multichannel frames of EQ. (1), arrives at the following equation:

$$p(t) = \text{diag}\left(\frac{1}{r_1(t)}, \ldots, \frac{1}{r_N(t)}\right)\begin{bmatrix} s(t+\tau_1-r_1(t)/c) \\ \vdots \\ s(t+\tau_N-r_N(t)/c) \end{bmatrix}, \qquad \text{EQ. 2}$$

$$0 \le t \le \Delta T,$$

where $\tau_n$, as depicted in FIG. 4, is the time offset from t=0 to the time where $p_n$(0), $r_n(t)$=$\|(t+\tau_n)v-r_s\|_2$ is the radial distance between the source of the leak at $r_s$ to the sensor position at $p_n(t)$.

Figure 5:
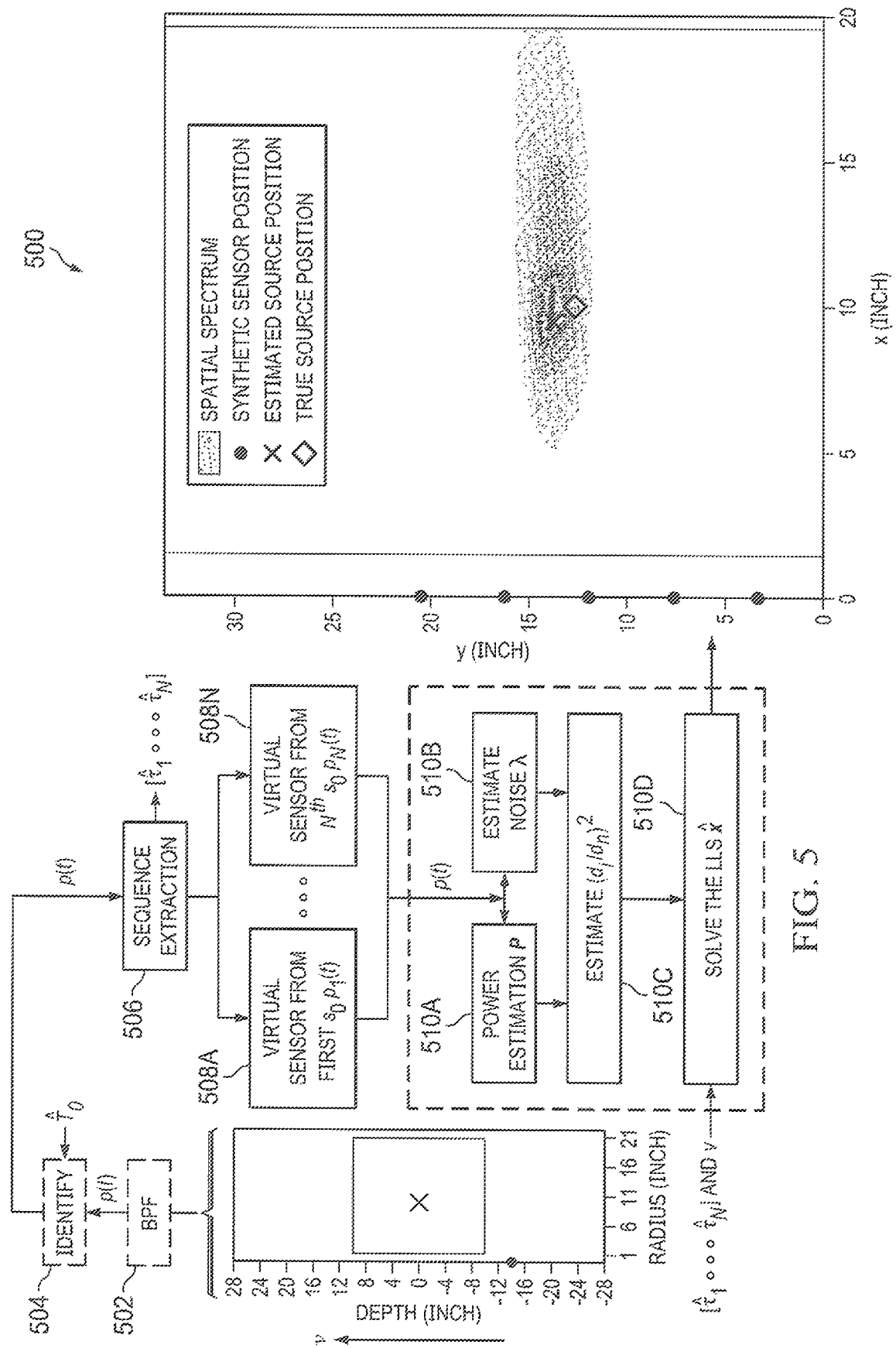
FIG. 5 illustrates a block diagram of a process for utilizing a virtual array of virtual sensors formed from one physical sensor (one sensor array) such as the physical sensor of FIGS. 1A and 1B, to determine a location of a leak based on signal strength of signals indicative of the leak.

FIG. 5 illustrates a block diagram of a process 500 for utilizing a virtual array formed from one physical sensor (one sensor array) such as the physical sensor 122 of FIGS. 1A and 1B to compute a spatial spectrum indicative of a location of a leak, such as the first leak 132 of FIGS. 1A and 1B. A recording of acoustic signals over a period of time T, as detected by the physical sensor 122 p(t), optionally passes through a band pass filter 502 to filter out noise. At block 504, if there is a particular known sequence $\hat{T}_0$ of interest, it is optionally used to identify regions where sequence $\hat{T}_0$ occurs in p(t) and determine $\hat{\tau}_1, \ldots, \hat{\tau}_N$, which are the elapsed time of all N portion in p(t) that has a high correlation with $\hat{T}_0$.

At block 506, a sequence extraction operation of the received signal of the physical sensor 122 is performed, either by extracting $\hat{\tau}_1, \ldots, \hat{\tau}_N$ from $\hat{T}$ or by a uniform decomposition of p(t) into N frames, i.e. $\hat{\tau}_n$=(n−1)$\Delta T$/N. In That regard, EQs. 1 and 2 provide example equations used to model and extract the decomposed received signal of the physical sensor 122 into virtual array of N total virtual sensors at block 508A-508N. Performing the sequence extraction operation provides the multi-channel representation of the virtual sensors using EQs. 1 and 2, which are described above in the discussion of FIG. 4. Further, performing the sequence extraction operation also obtains the value of N virtual signals that together form an array of virtual sensors, where each virtual sensor of the array of virtual sensors is located at a respective virtual distance relative to the physical sensor. In some embodiments, the virtual distance of the N virtual sensors relative to the physical sensor $m_1$ is $[m_{1,1} \ldots m_{1,N}]$, where $$m_{1,n} = m_1 + v\frac{\tau_n \Delta T}{N},$$

which is the average location of the sensor within the $\Delta T$ window, o is an offset variable to adjust the position of the virtual sensor. In some embodiments, $\tau_n=(n-1)/N$ with o=1. In further embodiments, it can be extended to an array of M physical sensor denoted as $[m_1 \ldots m_M]$ with each physical sensor having N virtual sensors.

The location of the leak is then determined. More particularly, at block 510A, the signal strength of acoustic signals associated with the first leak 132 is estimated. In some embodiments, the signal strength of the acoustic signals associated with the first leak 132 is an average of the signal strength of the virtual signals of the array of virtual sensors shown in blocks 508A-508N. In one or more of such embodiments, the average signal strength of the virtual signals is determined based on the following equation:

$$P_{ave} = \frac{1}{\Delta T}\int_0^{\Delta T}|p(t)|^2 dt = [P_1 \ldots P_N]^T, \quad \text{EQ: 3}$$

where the average power (in dB) of the multichannel may be expressed in log normal by the following equation:

$$P_n = P_s - 10\log_{10}r_n^2 + q_n \quad \text{EQ: 4}$$

where $P_s$ is the average transmitted signal power (in dB), $r_n$ is the average distance from the source to the nth frame position, $q_n$ is the average frame noise (in db) modelled as a Gaussian Normal $q_n \sim \mathcal{N}(0, \sigma_n^2)$.

In some embodiments, where EQ. 4 is too restrictive as it requires the knowledge of the average transmitted signal power $P_s$, a differential version can be derived by using the first frame as reference via the following equation:

$$P_{n,1} = -\ln\left(\frac{r_n}{r_1}\right)^2 + w_{n,1}, n=2,\ldots,N \quad \text{EQ. 5}$$

where $P_{n,1}=0.1 \ln 10 (P_n-P_1)$, $w_{n,1}=0.1 \ln 10 (q_n-q_1)$, and $w_{n,1}$ is a unit less function of $q_n$, that captures the noise component as described in EQ 4.

In some embodiments, the differential power expressed in EQ. 5 may be rearranged into the following equation:

$$e^{-P_{n,1}} = \left(\frac{r_n}{r_1}\right)^2 e^{-w_{n,1}} \quad \text{EQ. 6}$$

In some embodiments, the equations are performed to determine at least one parametric component of the signal strength of each virtual signal of the plurality of virtual signals based on a transfer function between the source of the leak and the virtual signals.

At block 510B, noise associated with the acoustic signals detected by the physical sensor 122 during the time period T is determined. In one or more embodiments, where noise is multiplicative, the following equation is used to evaluate the expectation of the differential power from the acoustic signals detected by the physical sensor 122:

$$\mathbb{E}\left\{\left(\frac{r_n}{r_1}\right)^2\right\} = d_{n,1} = e^{-P_{n,1}}e^{-\frac{1}{2}(\lambda_n^2+\lambda_1^2)} \quad \text{EQ. 7}$$

where $\lambda_n^2=0.01(\ln 10)^2\sigma_n^2$ $\lambda_n$ is a function of $\sigma_n^2$ as defined in EQ 4, and $d_{n,1}$ is the expectation of the differential power of the nth virtual sensor. At block 510C, an estimation of the location of the leak is performed based on the signal strength of the acoustic signals and excluding the detected noise. Further, $r_n^2$ may be defined as the squared distance between the source of the leak and the nth virtual sensor and represented by the following equation:

$$r_n^2 = (x_n-x)^2 + (y_n-y)^2, n=1,\ldots N, \quad \text{EQ. 8}$$

where $(x_n, y_n)$ and $(x, y)$ are the average location of the nth virtual sensor and the true source location respectively. In one or more embodiments, the differential channel can be expressed as a least square form and in a matrix form in the following two equations:

$$d_{n,1}r_1^2 = r_n^2 + \boldsymbol{w}_n, n=2,\ldots,N, \quad \text{EQ. 9}$$

$$A\theta = b + \boldsymbol{w}, \text{ where} \quad \text{EQ. 10}$$

$$A = \begin{bmatrix} 2x_2 - 2d_{2,1}x_1 & 2y_2 - 2d_{2,1}y_1 & d_{2,1}-1 \\ \vdots & \vdots & \vdots \\ 2x_N - 2d_{N,1}x_1 & 2y_N - 2d_{N,1}y_1 & d_{N,1}-1 \end{bmatrix}, \quad \text{EQ. 11}$$

$$\theta = \begin{bmatrix} x \\ y \\ x^2+y^2 \end{bmatrix}, \quad \text{EQ. 12}$$

$$b = \begin{bmatrix} x_2^2 + y_2^2 - d_{2,1}(x_1^2 + y_1^2) \\ \vdots \\ x_N^2 + y_N^2 - d_{N,1}(x_1^2 + y_1^2) \end{bmatrix}, \quad \text{EQ. 13}$$

$$\boldsymbol{w} = \begin{bmatrix} \boldsymbol{w}_2 \\ \vdots \\ \boldsymbol{w}_N \end{bmatrix} \quad \text{EQ. 14}$$

where A, b, and $\theta$ are variables used to solve the least square problem.

At block 510D, a localization of the first leak 132 is determined by the following least square estimation equation:

$$\hat{\theta} = (A^T C_\omega^{-1} A)A^T C_\omega^{-1} b \quad \text{EQ. 15}$$

where the noise covariance matrix $C_\omega$ can be approximated with $C_\omega = \text{cov}(\omega) \approx \Sigma\Lambda\Sigma$, where $\Sigma = \text{diag}(d_{2,1}^{1/2},\ldots,d_{N,1}^{1/2})$, and where $$\Lambda = \begin{bmatrix} e^{(\lambda_2^2+\lambda_1^2)}-1 & e^{\lambda_1^2}-1 & \ldots & e^{\lambda_1^2}-1 \\ \vdots & \vdots & \ddots & \vdots \\ e^{\lambda_1^2}-1 & e^{\lambda_1^2}-1 & \ldots & e^{(\lambda_2^2+\lambda_1^2)}-1 \end{bmatrix} \quad \text{EQ. 16}$$

More particularly, $C_\omega$ of EQ. 11 is the noise covariance function, a common block function in solving least square problem. Further, $\Lambda$ is the expression found by evaluating the covariance of EQ. 15.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a method of downhole leak detection, comprising: obtaining physical signals detected by a physical sensor over a period of time while the physical sensor is traveling along a wellbore, wherein the physical signals are acoustic signals of a leak; performing a sequence extraction operation on the physical signals of the physical sensor to obtain a plurality of virtual signals associated with an array of virtual sensors, wherein each virtual sensor of the array of virtual sensors is located at a respective virtual distance relative to the physical sensor; determining a signal strength of the plurality of virtual signals; and determining a location of the leak based on the signal strength of the plurality of virtual signals.

Clause 2, the method of clause 1, further comprising decomposing the physical signals into a plurality of multi-channel frames each having a threshold duration, wherein the plurality of virtual signals occur within the plurality of multi-channel frames.

Clause 3, method of clause 1 or 2, wherein performing the sequence extraction operation comprises extracting the plurality of virtual signals that occur within the plurality of multi-channel frames.

Clause 4, the method of clause 3, further comprising: determining a signal strength of each virtual signal of the plurality of virtual signals; and determining an average signal strength of the plurality of virtual signals, wherein the signal strength of the plurality of virtual signals is the average signal strength of the plurality of virtual signals.

Clause 5, the method of clause 3 or 4, further comprising: determining at least one parametric component of the signal strength of the plurality of virtual signals based on a transfer function between a source of the leak and the plurality of virtual signals; determining noise components of the plurality of virtual signals; wherein determining the signal strength of the plurality of virtual signals further comprises determining the signal strength of the plurality of virtual signals based on the at least one parametric component; and excluding the noise components from the signal strength of the plurality of virtual signals.

Clause 6, the method of any of clauses 3-5, further comprising: determining an average location of the plurality of virtual sensors; determining an average location of the physical sensor, and determining an actual location of the physical sensor, wherein determining the location of the leak is based on the average location of the plurality of virtual sensors, the average location of the physical sensor, and the actual location of the physical sensor.

Clause 7, the method of any of clauses 1-6, further comprising filtering the physical signals through a band-pass filter prior to performing the sequence extraction operation.

Clause 8, the method of any of clauses 1-7, further comprising determining an approximate radial distance of the leak relative to the physical sensor, wherein the location of the leak is expressed by the approximate radial distance.

Clause 9, the method of clause 8, wherein the approximate radial distance comprises two or more components along two or more perpendicular axes that form a plane along which the physical sensor is displaced along, and wherein determining the approximate radial distance comprises determining a distance along a first component and a distance along a second component, wherein the first component is associated with an x-axis, and wherein the second component is associated with a y-axis.

Clause 10, the method of any of clauses 1-9, wherein the virtual distance of each respective sensor of N virtual sensors relative to the physical sensor is $[m_{1,1} \ldots m_{1,N}]$, and wherein $$m_{1,n} = m_1 + v\frac{\tau_n \Delta T}{N}.$$

Clause 11, the method of any of clauses 1-10, wherein the physical sensor is traveling along the wellbore at an approximately known velocity.

Clause 12, a downhole leak detection system comprising: a leak detector having a physical sensor operable to travel along a wellbore and detect physical signals over a period of time while the leak detector is traveling along a wellbore, wherein the physical signals are acoustic signals of a leak; and a processor communicatively coupled to the leak detector and operable to: perform a sequence extraction operation on the physical signals of the physical sensor to obtain a plurality of virtual signals associated with an array of virtual sensors, wherein each virtual sensor of the array of virtual sensors is located at a respective virtual distance relative to the physical sensor; determine a signal strength of the plurality of virtual signals; and determine a location of the leak based on the signal strength of the plurality of virtual signals.

Clause 13, the downhole leak detection system of clause 12, wherein the processor is further operable to: decompose the physical signals into a plurality of multi-channel frames each having a threshold duration, wherein the plurality of virtual signals occur within the plurality of multi-channel frames; and extract the plurality of virtual signals that occur within the plurality of multi-channel frames while performing the sequence extraction operation.

Clause 14, the downhole leak detection system of clause 12 or 13, wherein the processor is further operable to: determine a signal strength of each virtual signal of the plurality of virtual signals; and determine an average signal strength of the plurality of virtual signals, wherein the signal strength of the plurality of virtual signals is the average signal strength of the plurality of virtual signals.

Clause 15, the downhole leak detection system of clause 14, wherein the processor is further operable to determine noise components of the plurality of virtual signals, wherein determining the signal strength of the plurality of virtual signals comprises determining the signal strength of the plurality of virtual signals excluding the noise components.

Clause 16, the downhole leak detection system of any of clauses 13-15, wherein the processor is further operable to: determine an average location of the physical sensor; and determine an actual location of the physical sensor, wherein determining the location of the leak is based on the average location of the physical sensor and the actual location of the physical sensor.

Clause 17, the downhole leak detection system of any of clauses 12-16, further comprising a bandpass filter operable to filter the physical signals before the physical signals are processed by the processor.

Clause 18, a non-transitory machine-readable medium comprising instructions stored therein, for execution by a processor, which when executed by the processor, causes the processor to perform operations comprising: obtaining physical signals detected by a physical sensor over a period of time while the physical sensor is traveling along a wellbore, wherein the physical signals are acoustic signals of a leak; decompose the physical signals into a plurality of multi-channel frames each having a threshold duration, wherein the plurality of virtual signals occur within the plurality of multi-channel frames; performing a sequence extraction operation on the physical signals of the physical sensor to obtain a plurality of virtual signals that are associated with an array of virtual sensors and occur within the plurality of multi-channel frames, wherein each virtual sensor of the array of virtual sensors is located at a respective virtual distance relative to the physical sensor; determining a signal strength of the plurality of virtual signals; and determining a location of the leak based on the signal strength of the plurality of virtual signals.

Clause 19, the non-transitory machine-readable medium of clause 18, further comprising instructions stored therein, which when executed by the processor, causes the processor to perform operations comprising: determining a signal strength of each virtual signal of the plurality of virtual signals; and determining an average signal strength of the plurality of virtual signals, wherein the signal strength of the plurality of virtual signals is the average signal strength of the plurality of virtual signals.

Clause 20, the non-transitory machine-readable medium of clause 18 or 19, further comprising instructions stored therein, which when executed by the processor, causes the processor to perform operations comprising: determining an average location of the physical sensor; and determining an actual location of the physical sensor, wherein determining the location of the leak is based on the average location of the physical sensor and the actual location of the physical sensor.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

The invention claimed is:

1. A method of downhole leak detection, comprising:
obtaining physical signals detected by a physical sensor over a period of time while the physical sensor is traveling along a wellbore, wherein the physical signals are acoustic signals of a leak;
performing a sequence extraction operation on the physical signals of the physical sensor to obtain a plurality of virtual signals associated with an array of virtual sensors, wherein a virtual signal obtained by a virtual sensor of the plurality of virtual sensors is approximately equal to a physical signal obtained by the physical sensor if the physical sensor is located at a location of the virtual sensor, wherein if the physical sensor is not located at a location of the virtual sensor, the virtual sensor is located at a virtual location and a virtual distance from the physical sensor, and wherein the virtual location and the virtual distance have values that are identical to values of a physical location and a physical distance from the physical sensor, respectively;
determining a signal strength of the plurality of virtual signals;
determining an average location of the physical sensor during the period of time;
determining an actual location of the physical sensor, and
determining a location of the leak based on the signal strength of the plurality of virtual signals, the average location of the physical sensor, and the actual location of the physical sensor.

2. The method of claim 1, wherein performing the sequence extraction operation comprises decomposing the physical signals into a plurality of multi-channel frames each having a threshold duration, wherein the plurality of virtual signals occur within the plurality of multi-channel frames.

3. The method of claim 2, wherein performing the sequence extraction operation comprises extracting the plurality of virtual signals that occur within the plurality of multi-channel frames.

4. The method of claim 3, further comprising:
determining a signal strength of each virtual signal of the plurality of virtual signals; and
determining an average signal strength of the plurality of virtual signals, wherein the signal strength of the plurality of virtual signals is the average signal strength of the plurality of virtual signals.

5. The method of claim 3, further comprising:
determining at least one parametric component of the signal strength of the plurality of virtual signals based on a transfer function between a source of the leak and the plurality of virtual signals;
determining noise components of the plurality of physical signals;
wherein determining the signal strength of the plurality of virtual signals further comprises:
determining the signal strength of the plurality of virtual signals based on the at least one parametric component; and
excluding the noise components of the physical signals when determining the signal strength of the plurality of virtual signals.

6. The method of claim 3, further comprising:
determining an average location of the plurality of virtual sensors;
wherein determining the location of the leak is further based on the average location of the plurality of virtual sensors.

7. The method of claim 1, further comprising filtering the physical signals through a band-pass filter prior to performing the sequence extraction operation.

8. The method of claim 1, further comprising determining an approximate radial distance of the leak relative to the physical sensor, wherein the location of the leak is expressed by the approximate radial distance.

9. The method of claim 8, wherein the approximate radial distance comprises two or more components along two or more perpendicular axes that form a plane along which the physical sensor is displaced along, and wherein determining the approximate radial distance comprises determining a distance along a first component and a distance along a second component, wherein the first component is associated with an x-axis, and wherein the second component is associated with a y-axis.

10. The method of claim 1, wherein the virtual distance of each respective sensor of N virtual sensors relative to the physical sensor is $[m_{1,1} \ldots m_{1,N}]$, and wherein $$m_{1,n} = m_1 + v\frac{\tau_n \Delta T}{N},$$

wherein and wherein $m_1$ is the physical sensor, $\tau_n$ is an offset, v is a velocity of the physical sensor, $\Delta T$ is a threshold duration of time, and N is a number of virtual sensors, and wherein n is a value from 1 to N.

11. The method of claim 1, wherein the physical sensor is traveling along the wellbore at an approximately known velocity.

12. A downhole leak detection system comprising:
a leak detector having a physical sensor operable to travel along a wellbore and detect physical signals over a period of time while the leak detector is traveling along a wellbore, wherein the physical signals are acoustic signals of a leak; and
a processor communicatively coupled to the leak detector and operable to;
perform a sequence extraction operation on the physical signals of the physical sensor to obtain a plurality of virtual signals associated with an array of virtual sensors, wherein a virtual signal obtained by a virtual sensor of the plurality of virtual sensors is approximately equal to a physical signal obtained by the physical sensor if the physical sensor is located at a location of the virtual sensor, wherein if the physical sensor is not located at a location of the virtual sensor, the virtual sensor is located at a virtual location and a virtual distance from the physical sensor;
determine a signal strength of the plurality of virtual signals;
determine an average location of the physical sensor during the period of time;
determine an actual location of the physical sensor, and
determine a location of the leak based on the signal strength of the plurality of virtual signals, the average location of the physical sensor, and the actual location of the physical sensor.

13. The downhole leak detection system of claim 12, wherein the processor is further operable to:
decompose the physical signals into a plurality of multi-channel frames each having a threshold duration to perform the sequence extraction operation, wherein the plurality of virtual signals occur within the plurality of multi-channel frames; and
extract the plurality of virtual signals that occur within the plurality of multi-channel frames while performing the sequence extraction operation.

14. The downhole leak detection system of claim 13, wherein the processor is further operable to:
determine a signal strength of each virtual signal of the plurality of virtual signals; and
determine an average signal strength of the plurality of virtual signals, wherein the signal strength of the plurality of virtual signals is the average signal strength of the plurality of virtual signals.

15. The downhole leak detection system of claim 14, wherein the processor is further operable to determine noise components of the physical signals, wherein determining the signal strength of the plurality of virtual signals comprises determining the signal strength of the plurality of virtual signals excluding the noise components.

16. The downhole leak detection system of claim 13, wherein the processor is further operable to:
determine an average location of the plurality of virtual sensors:
determine an average location of the physical sensor, and
determine an actual location of the physical sensor,
wherein determining the location of the leak is further based on the average location of the plurality of virtual sensors.

17. The downhole leak detection system of claim 12, further comprising a bandpass filter operable to filter the physical signals before the physical signals are processed by the processor.

18. A non-transitory machine-readable medium comprising instructions stored therein, for execution by a processor, which when executed by the processor, causes the processor to perform operations comprising:
obtaining physical signals detected by a physical sensor over a period of time while the physical sensor is traveling along a wellbore, wherein the physical signals are acoustic signals of a leak;
performing a sequence extraction operation on the physical signals of the physical sensor to obtain a plurality of virtual signals that are associated with an array of virtual sensors and occur within the plurality of multi-channel frames, wherein performing the sequence extraction operation comprises decomposing the physical signals into the plurality of multi-channel frames each having a threshold duration, wherein a virtual signal obtained by a virtual sensor of the array of virtual sensors is approximately equal to a physical signal obtained by the physical sensor if the physical sensor is located at a location of the virtual sensor, wherein a plurality of virtual signals occur within the plurality of multi-channel frames, wherein if the physical sensor is not located at a location of the virtual sensor, the virtual sensor is located at a virtual location and a virtual distance from the physical sensor, and wherein the virtual location and the virtual distance have values that are identical to values of a physical location and a physical distance from the physical sensor, respectively;

determining a signal strength of the plurality of virtual signals;

determining an average location of the physical sensor during the period of time;

determining an actual location of the physical sensor, and determining a location of the leak based on the signal strength of the plurality of virtual signals, the average location of the physical sensor, and the actual location of the physical sensor.

19. The non-transitory machine-readable medium of claim 18, further comprising instructions stored therein, which when executed by the processor, causes the processor to perform operations comprising:

determining a signal strength of each virtual signal of the plurality of virtual signals; and determining an average signal strength of the plurality of virtual signals, wherein the signal strength of the plurality of virtual signals is the average signal strength of the plurality of virtual signals.

20. The non-transitory machine-readable medium of claim 18, further comprising instructions stored therein, which when executed by the processor, causes the processor to perform operations comprising:

determining an average location of the plurality of virtual sensors;

wherein determining the location of the leak is further based on the average location of the plurality of virtual sensors.

* * * * *